United States Patent Office 3,099,743
Patented July 30, 1963

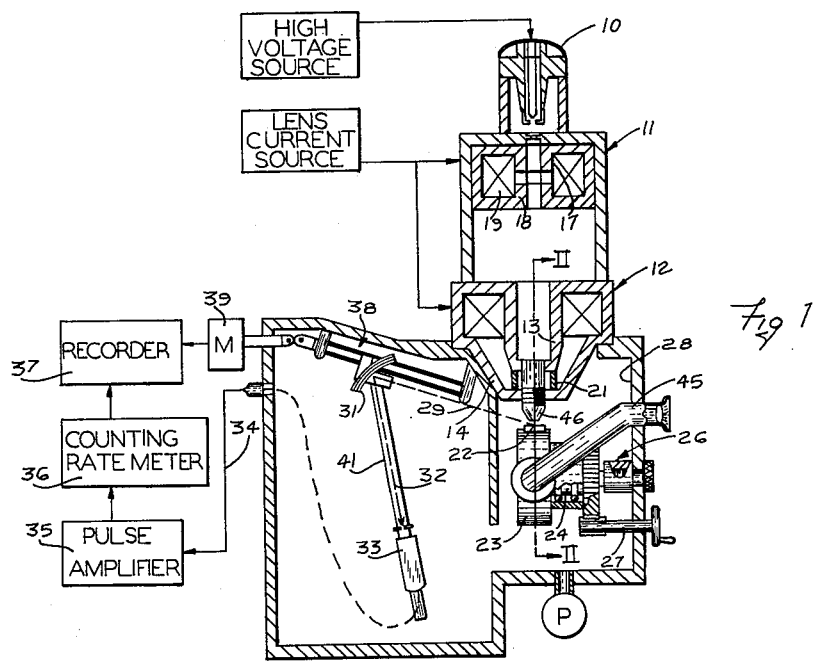

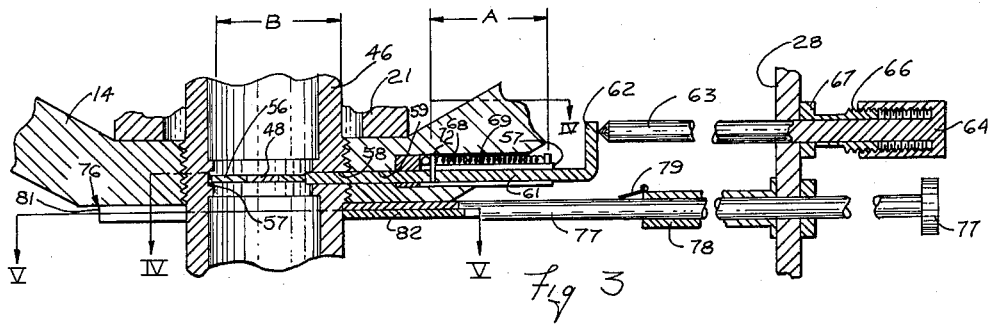# 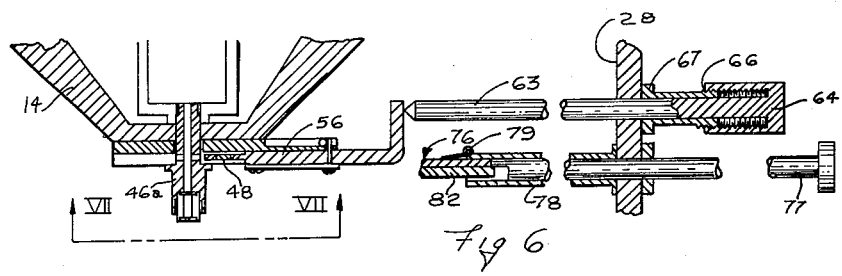 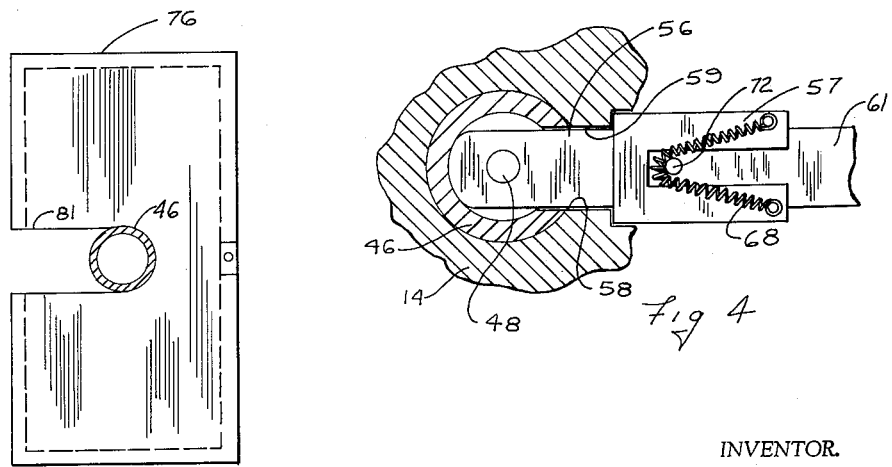

3,099,743
COMBINED ELECTRON PROBE MICROANALYZER
AND X-RAY DIFFRACTION INSTRUMENT
Takeo Ichinokawa, 35—304 Yirgaoka-Danchi, 716 Ta-
kaishi, Kawasaki-shi, Kanagawa-ken, Japan
Filed July 5, 1962, Ser. No. 207,558
Claims priority, application Japan July 7, 1961
3 Claims. (Cl. 250—51.5)

This invention relates to an electron probe microana-
lyzer and, more particularly, it relates to an improved
electron probe microanalyzer which also is suitable for
measuring the crystalline structure of a microportion of a
specimen by X-ray diffraction.

An electron probe microanalyzer is an instrument for
detecting the elements in a microportion of a specimen
by bombarding the microportion with an extremely nar-
row electron beam and detecting the wave lengths of
X-rays emitted from the bombarded portion. If it were
possible with crystalline specimens, such as metals, to
detect not only the elements which comprise the crystal
but also the crystalline structure, including the azimuth
and orientation structure of the crystal, the instrument
would be even more effective for studying and/or testing
the properties of materials.

However, it has hitherto been possible only to detect
the elements in the microportion of the specimen which
can be directly observed optically or on the scanning
electron image of the sample and it has been impossible
to detect the azimuth and orientation structure of the
crystal on the microportion.

According to the present invention, as will be explained
hereinafter in greater detail, not only the elements in a
microportion of a specimen but also the crystalline struc-
ture can be detected by applying a simple device to a con-
ventional electron probe microanalyzer for radiating a
narrow X-ray beam onto the surface of the sample and
detecting the refraction X-ray diffraction pattern on an
X-ray sensitive plate or film.

Accordingly, it is an object of this invention to provide
an improved electron probe microanalyzer which is also
usable for making X-ray diffraction photographs.

It is a further object of this invention to provide an
improved electron probe microanalyzer, as aforesaid,
which can be readily converted for use either as an elec-
tron probe microanalyzer or as an X-ray diffraction in-
strument.

It is a further object of this invention to provide an
improved electron probe microanalyzer, as aforesaid, in
which the additional equipment necessary to convert same
to use for X-ray diffraction photographic purposes is rela-
tively simple and inexpensive and which can be added to
conventional equipment easily and with a minimum of
cost.

It is a further object of this invention to provide an
improved electron probe microanalyzer, as aforesaid, in
which the necessary operations to convert the apparatus
from use as an electron probe microanalyzer to use as an
X-ray diffraction instrument can be made quickly and
conveniently and without opening the vacuum chamber of
the instrument.

Other objects and advantages of the invention will be
apparent to persons acquainted with equipment of this
type upon reading the following disclosure and inspecting
the accompanying drawings.

In the drawings:

FIGURE 1 is a schematic plan view of an electron
probe microanalyzer embodying the invention.

FIGURE 2 is a sectional view taken along the line
II—II of FIGURE 1.

FIGURE 3 is a sectional view, on an enlarged scale,
taken along the line III—III of FIGURE 2.

FIGURE 4 is a sectional view taken along the line
IV—IV of FIGURE 3.

FIGURE 5 is a sectional view taken along the line
V—V of FIGURE 3.

FIGURE 6 is a view similar to FIGURE 3 and showing
a modification.

FIGURE 7 is a bottom view of a portion of the appa-
ratus shown in FIGURE 6 substantially as taken along
the line VII—VII of FIGURE 6.

Referring to FIGURE 1, the electron probe microana-
lyzer comprises an electron gun 10 and a pair of electron
lenses 11 and 12. The electron lens 12 is comprised of
a pair of annular poles 13 and 14 which are energized
by a winding 16. The lens 11 is comprised of annular
poles 17 and 18 which are energized by a winding 19.
The poles 13 and 14 are placed on opposite sides of a
nonmagnetic substance 21 to form an objective lens for
the electron beam. If desired or necessary, deflection
coils (not shown) may be located above the lens 12 to
effect movement of the electron beam across the specimen
being examined. This is in accordance with conventional
practice and hence requires no further description.

The specimen 22 to be examined is mounted on a disk
23 which is supported upon a shaft 24. The shaft 24
can be moved laterally by a manually operable adjusting
mechanism indicated generally at 26. Further, the shaft
24 can be rotated about its own axis by a further adjust-
ing mechanism 27. Thus, various portions of the speci-
men 22 can be examined at the will of an operator. It
will be observed that the specimen can be moved by
mechanism located outside of the vacuum chamber 28 so
that analysis of various portions thereof can be carried
out quickly and easily and without disassembling the
apparatus.

The electron source 10 and the lens system are arranged
so that an extremely narrow electron beam can be pro-
jected onto the specimen 22. Bombardment of the speci-
men in this fashion causes the specimen to emit X-rays
which travel substantially along the line indicated at 29
to a crystal 31 having known lattice distances, such as
LiF or ADP (ammonium dihydrogen phosphate). The
X-rays from the specimen 22 are reflected by the crystal
31 and are directed along the line 32 to a device 33
which is responsive to X-rays. The device 33, for ex-
ample, may be the same as that shown in my copending
application Serial No. 189,097, namely, a Geiger-Muller
counter or proportional counter which provides an elec-
trical output. This output is transmitted by the line 34
to a pulse amplifier 35 thence to a counting rate meter
36 and, if desired, to a continuous pen recorder 37. The
crystal 31 is carried by a suitable goniometer mechanism
38 which is driven by a motor 39, the operation of the
motor being co-ordinated with the operation of the pen
recorder. The goniometer mechanism will effect rotation
of the crystal 31 about an axis parallel with the reflecting
surface thereof and simultaneously will move the arm 41
on which the X-ray detector 33 is mounted at a rate twice
that of the crystal 31 so that the reflected X-rays will fall
on the X-ray detector 33. The reasons for this and,
indeed, the actual structure of the goniometer itself are
well known to persons skilled in the art and, hence, require
no further description.

When an electron beam is directed upon a micropor-
tion of the specimen 22, the characteristic X-rays of the
elements and the portions of the sample are emitted. The
elements in the portion can be analyzed by measuring the
wave lengths and intensities of the X-rays utilizing the
above-mentioned crystal 31 and X-ray detector 33. Also,
one-dimensional or two-dimensional distribution of an
element on the sample can be detected by scanning the
electron beam by the deflection coils along the surface of
the sample.

An optical microscope 45 is mounted within the vacuum chamber 28 whereby the specimen 22 can be examined. In order to examine the specimen visually, the disk 23 will be rotated about the axis of shaft 24 to move the specimen 22 from a position under the electron beam to a position under the lens of the microscope.

A nonmagnetic adapter 46 is mounted in the magnetic pole 14 of the lens 12. In cases where the apparatus is to be used solely for electron probe measurements, the adapter 46 can be removed. However, where the apparatus is to be used for both electron probe measurements and for X-ray diffraction measurements, the adapter 46 should be left in place.

The adapter 46 is a hollow member and is shaped to provide a stopping aperture 47 at the upper end thereof, which aperture, for example, may be about 1 millimeter in diameter. A target film or foil 48 capable of emitting X-rays is removably supported in the adapter 46 below the aperture 47. The adapter 46 has a further stopping aperture 49 located below the foil 48 and still another aperture 51 is provided in the lower end wall of the adapter 46. The aperture 49 is of several microns in diameter and it is placed above the specimen 22 a suitable distance, e.g., on the order of about 10 millimeters both from the foil 48 and from the specimen 22. The aperture 51 is several hundred microns in diameter. The aperture 47 limits the diameter of the electron beam which bombards the film 48 wile the aperture 51 blocks scattered X-rays which may be emitted from the edge of the stopping aperture 49.

The film 48, which can be made of a suitable X-ray emitting material, such as copper, tungsten or iron, is of several microns in thickness and acts as a target against which the electron beam impinges.

The target foil 48 is mounted in a frame 56 which frame is slidable within guideways 57 affixed to the adapter 46. The frame 56 is slidable through a lateral slots 58 in the adapter 46. The pole 14 has a further slot 59 therethrough which is aligned with the slot 58 and the frame 56 is receivable thereinto. A rod 61 is connected to the frame 56 for moving said frame between a position wherein it is received within the adapter 46 and the film 48 is disposed in the path of the electron beam and a position where the frame 56 and the film 48 are located outside of the adapter 46. The rod 61 has an upstanding flange 62 at one end thereof and said flange is contacted by a plunger 63 which extends through a side wall of the chamber 28. An internally threaded cap 64 is integral with the plunger 63 and the internal threads contact a threaded portion 66 of a member 67 which is secured to the wall of the chamber 28 and which is located on the outside thereof. Thus, upon rotation of the cap 64, the plunger 63 is moved inwardly or outwardly and thereby effects corresponding movement of the rod 61 and the frame 56. A spring 68 is anchored at its ends on the guideway 57, the same being fixed with respect to the adapter 46. The rod 61 carries a pin 72 which is engageable with the bent portion of the spring 68. Thus, the spring normally urges the rod 61 and thereby the frame 56 to their outward position and maintains the flange 62 in contact with the plunger 63. However, the spring 68 can yield to permit movement of the rod inwardly to thereby permit the frame 56 and the film 48 to be positioned within the adapter 46. A photographic film holder 76 is connected to a plunger 77, which plunger extends through the wall of the chamber 28 whereby the plunger can be manipulated to move the film holder from a retracted position to a position adjacent the adapter 46. In its retracted position, the film holder 76 is received within a casing 78, which casing is secured to and located inside of the vacuum chamber 28. The casing 78 has an end wall 79 hingedly connected thereto whereby to permit movement of the film holder 76 outwardly therefrom. The casing 78 and the end wall 79 are made of a material which is capable of shielding the film mounted in the holder from radiation present within the vacuum chamber 28. The film holder 76 has a laterally extending slot 81 therein, into which the adapter 46 can be received. Thus, the X-ray film 82 which is mounted in the X-ray holder 76 surrounds the entirety of the adapter except for that portion thereof which must be capable of moving through the slot 81.

Referring to FIGURES 6 and 7, there is shown a modification of the invention employing a different form of adapter structure which is indicated by the reference numeral 46a. Here the foil-supporting mechanism and the adapter are located below the pole piece 14 and are attached thereto in a different manner than in the embodiment of the invention previously described. The construction and manner of operation of the foil-moving mechanism and the photographic film mechanism is substantially the same as in the previously described embodiment and, hence, need not be repeated.

*Operation*

While the operation of the apparatus has been indicated before, the same will be briefly repeated in order to insure a complete understanding of the invention.

When the film 48 is located outside of the adapter 46 and the film holder 76 and the film carried thereby is located within the casing 78, the apparatus can be used in a conventional fashion as an electron probe microanalyzer. Since the operation of an electron probe microanalyzer is well known and since same has been indicated before, it is believed unnecessary to discuss this in detail.

When it is desired to operate the apparatus as an X-ray diffraction instrument, it may be necessary to change the focus of the electron beam. This is because when operating as an electron probe microanalyzer, the beam would have been focused on the surface of the specimen 22 whereas to convert the apparatus to use as an X-ray diffraction instrument, the electrical current passing the coil 16 is adjusted so as to focus the electron beam at the point where the foil 48 will eventually be positioned.

It will, on the examination of a specimen, ordinarily be desired to first examine a microportion of the specimen with the apparatus operating as an electron probe microanalyzer and then to examine the same microportion with the apparatus arranged to operate as an X-ray diffraction instrument. This sequence of steps can, of course, be reversed.

Before carrying out either of the afore-mentioned procedures, it is necessary to establish the particular microportion of the sample which is to be bombarded either by the electron beam or by the X-rays. For this purpose, the disk 23 is rotated to bring the specimen 22 under the lens system of the microscope 45. The disk 23 can be adjusted circumferentially and axially with respect to the housing 28 and thereby with respect to the electron source in order to bring the desired microportion of the sample into the appropriate position. Then by rotating the adjusting mechanism through a suitable angular step, the disk can be moved to place the microportion in alignment with the electron beam. of course, in selecting the microportion to be examined, the microscope will be provided with cross wires for establishing a selected position. Further, for a suitable calibration of the adjusting mechanism 27, it can be assumed that the selected microportion will always be returned to the proper position for the subsequent examination operation.

The microanlysis of the microportion is carried out as above described with the apparatus operating as an electron probe microanalyzer. If necessary, the microportion of the specimen may be optically examined at this time by returning the disk to a position where said microportion is visible through the microscope. Usually, the area which has been bombarded with the electron beam will undergo some change in its physical appearance.

The selected microportion can then be returned to its position in alignment with the adapter 46 at which time the foil 48 is moved from its retracted position outside of the adapter 46 to its position within said adapter whereby it is in a position to be bombarded by the electron beam so that it will emit X-rays.

After the foil 48 is moved into the adapter, the photographic film holder 76 is moved so that the adapter 46 bottoms in the slot 81 of said film holder. Then, the apparatus is in condition for taking an X-ray photograph of the microportion to be examined. The electron beam is thereupon directed and focused at the surface of the foil 48 which causes X-rays to be emitted from a small point on the foil 48. Said X-rays pass through the stopping apertures 49 and 51 and irradiate the selected microportion of the specimen 22 whereupon they are diffracted in accordance with the crystal structure of the microportion and give Laue spots on the X-ray sensitive plate or film blank. By analysis of the Laue pattern, the structure, azimuth and orientation of the crystal can be determined.

Thus, the invention provides an electron probe microanalyzer which by simple and readily made adjustments can be utilized be determined the elements in a microportion of a specimen which can also be utilized as an X-ray diffraction instrument in order to determine the crystalline structure, azimuth and orientation of the same portion.

In the interest of simplifying the drawing and the disclosure, certain conventional parts in the apparatus shown in FIGURE 1 have been omitted or simplified. In particular, the various seals which would be provided between the various parts of the apparatus whereby an effective vacuum can be maintained in the chamber 28 have not been shown because these are conventional and form no part of the invention. Further, the optical microscope arrangement can be modified, and particularly in situations where it is possible to install the optical microscope in the lens 12, it would not then be necessary to provide a rotatable specimen holder.

While particular preferred embodiments of the invention have been described, the invention contemplates such changes or modifications therein which lie within the scope of the appended claims.

What is claimed is:

1. An electron probe microanalyzer and X-ray diffraction instrument, comprising:
   an electron source and lens system for projecting an electron beam onto a specimen for causing the specimen to emit X-rays;
   means for detecting the emitted X-rays;
   a specimen holder;
   a target film capable of emiting X-rays when struck by an electron beam;
   means for removably positioning said target film between said lens system and said specimen holder whereby said specimen may selectively be bombarded by X-rays emitted from said target film;
   an X-ray photographic film and means for removably positioning said photographic film for receiving back reflected X-rays from said specimen whereby a photograph of the X-ray diffraction pattern of said specimen may be obtained.

2. An instrument as defined in claim 1, including a vacuum chamber enclosing said source, said lens system, said specimen holder, said target film and said photographic film; and
   means located outside of said vacuum chamber for adjusting the position of said target film and said photographic film at the will of an operator.

3. An instrument as defined in claim 1, including stopping aperture means between the target film and said specimen holder.

No references cited.